(12) United States Patent
Kai et al.

(10) Patent No.: US 11,967,695 B2
(45) Date of Patent: Apr. 23, 2024

(54) ELECTRODE STRUCTURE, METHOD FOR PRODUCING ELECTRODE STRUCTURE, ELECTROLYTIC CELL, AND ELECTROLYZER

(71) Applicant: ASAHI KASEI KABUSHIKI KAISHA, Tokyo (JP)

(72) Inventors: Naoyuki Kai, Tokyo (JP); Sohei Iiyama, Tokyo (JP); Akiyasu Funakawa, Tokyo (JP); Yoshifumi Kado, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 652 days.

(21) Appl. No.: 17/257,688

(22) PCT Filed: Jul. 5, 2019

(86) PCT No.: PCT/JP2019/026902
§ 371 (c)(1),
(2) Date: Jan. 4, 2021

(87) PCT Pub. No.: WO2020/009241
PCT Pub. Date: Jan. 9, 2020

(65) Prior Publication Data
US 2021/0320287 A1 Oct. 14, 2021

(30) Foreign Application Priority Data

Jul. 6, 2018 (JP) .................. 2018-129139
Jul. 6, 2018 (JP) .................. 2018-129276

(51) Int. Cl.
*H01M 4/04* (2006.01)
*C25B 9/23* (2021.01)
*C25B 9/63* (2021.01)

(52) U.S. Cl.
CPC ............ *H01M 4/0404* (2013.01); *C25B 9/23* (2021.01); *C25B 9/63* (2021.01); *H01M 2300/0097* (2013.01)

(58) Field of Classification Search
CPC .. C25B 1/46; C25B 11/02; C25B 9/19; C25B 9/23; C25B 9/63; H01M 2300/0097; H01M 4/0404; Y02E 60/10
See application file for complete search history.

(56) References Cited

U.S. PATENT DOCUMENTS

| 2005/0173257 A1 | 8/2005 | Bulan et al. |
| 2006/0042935 A1 | 3/2006 | Houda et al. |

(Continued)

FOREIGN PATENT DOCUMENTS

| CN | 104254644 | 12/2014 |
| CN | 105531399 | 4/2016 |

(Continued)

OTHER PUBLICATIONS

Supplementary European Search Report issued in EP Application No. 19829768.1, dated Jul. 26, 2021.
International Search report issued in International Patent Application No. PCT/JP2019/026902, dated Aug. 13, 2019.

(Continued)

*Primary Examiner* — Victoria H Lynch
(74) *Attorney, Agent, or Firm* — GREENBLUM & BERNSTEIN, P.L.C.

(57) ABSTRACT

An electrode structure including:
an electrode;
a current collector facing the electrode;
an elastic body located between the electrode and the current collector, the elastic body having conductivity; and
an electrode fixing member located between the elastic body and the current collector,
wherein at least a part of a peripheral edge of the electrode being fixed between the electrode fixing member and the current collector.

11 Claims, 10 Drawing Sheets

(56) References Cited

U.S. PATENT DOCUMENTS

| | | |
|---|---|---|
| 2012/0241314 A1 | 9/2012 | Madono et al. |
| 2015/0027878 A1 | 1/2015 | Funakawa et al. |
| 2015/0114830 A1 | 4/2015 | Asaumi et al. |
| 2016/0032468 A1 | 2/2016 | Fulvio et al. |
| 2016/0237577 A1 | 8/2016 | Hatano et al. |

FOREIGN PATENT DOCUMENTS

| | | |
|---|---|---|
| EP | 2 816 141 | 12/2014 |
| JP | 2000-178781 | 6/2000 |
| JP | 4453973 | 4/2010 |
| JP | 2010-111947 | 5/2010 |
| JP | 2012-057199 | 3/2012 |
| JP | 2012-140652 | 7/2012 |
| JP | 2014-037586 | 2/2014 |
| JP | 5819790 | 11/2015 |
| JP | 2017-220370 | 12/2017 |
| KR | 2004-0049312 | 6/2004 |
| KR | 20140114023 A | 9/2014 |
| KR | 20150140347 A | 12/2015 |

OTHER PUBLICATIONS

International Preliminary Report on Patentability issued in International Patent Application No. PCT/JP2019/026902, dated Jan. 12, 2021.

[Figure 1]
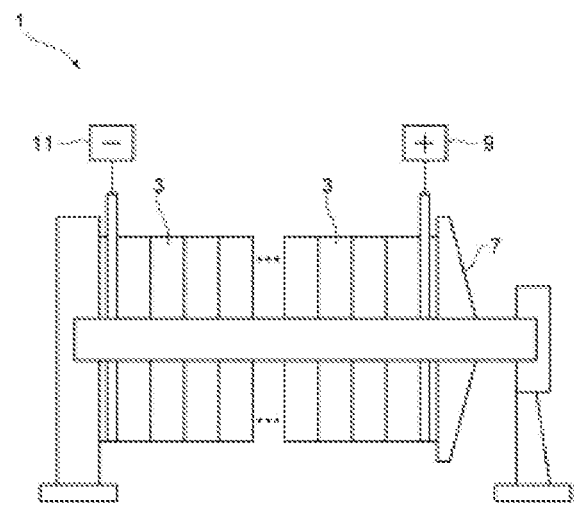
[Figure 2]
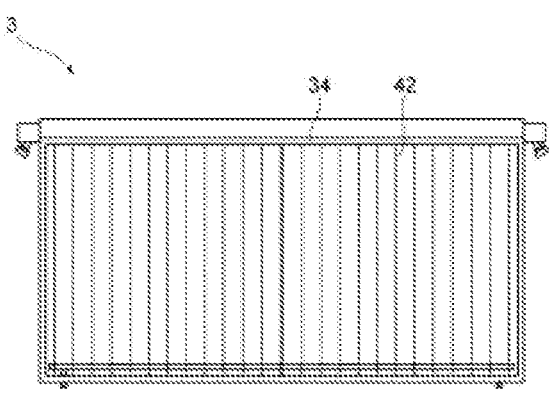

[Figure 3]
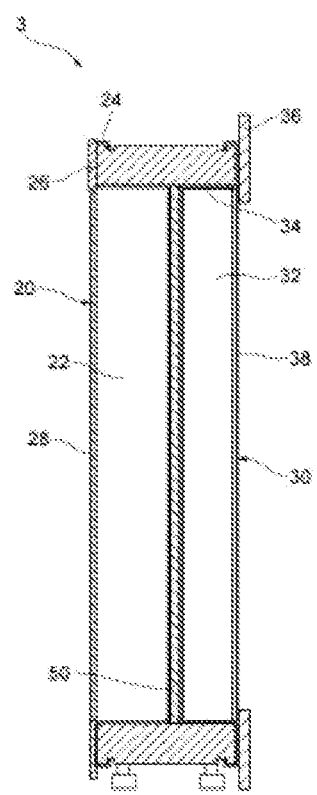

[Figure 4]
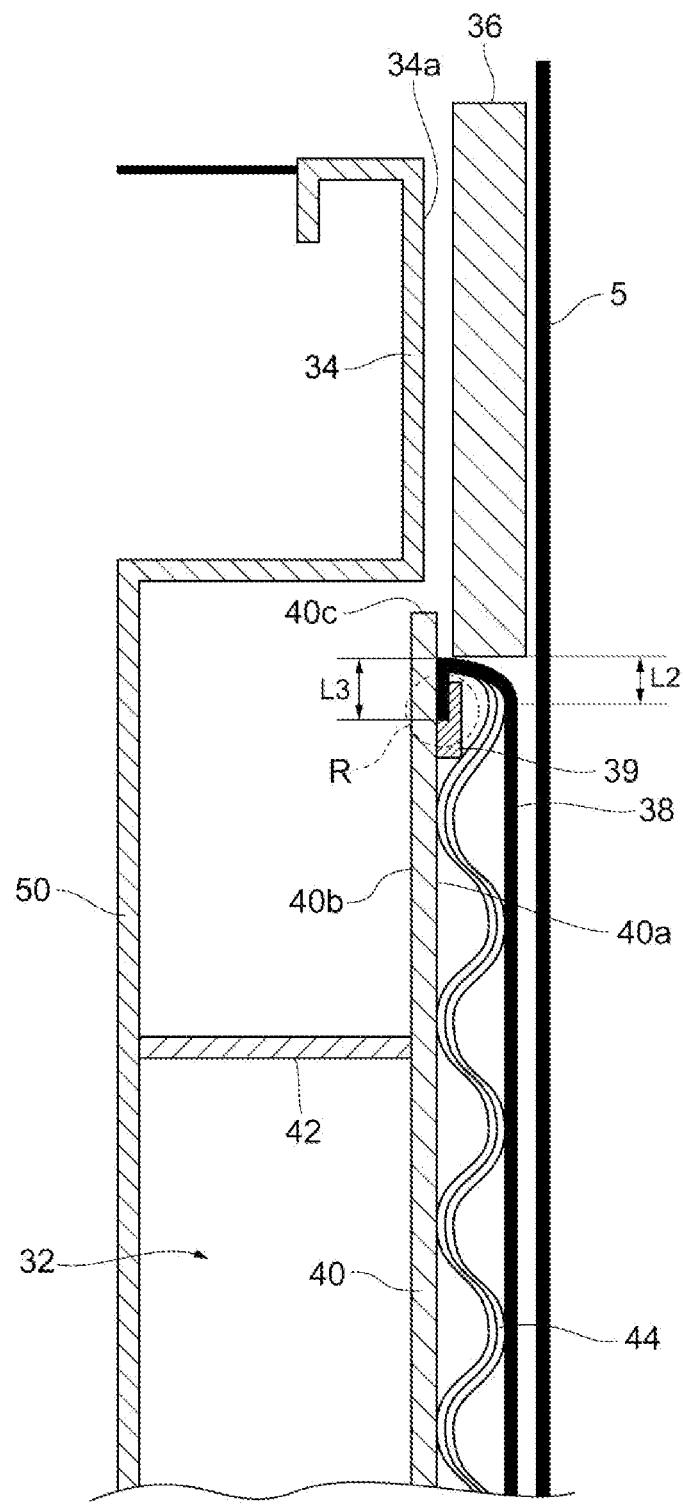

[Figure 5]
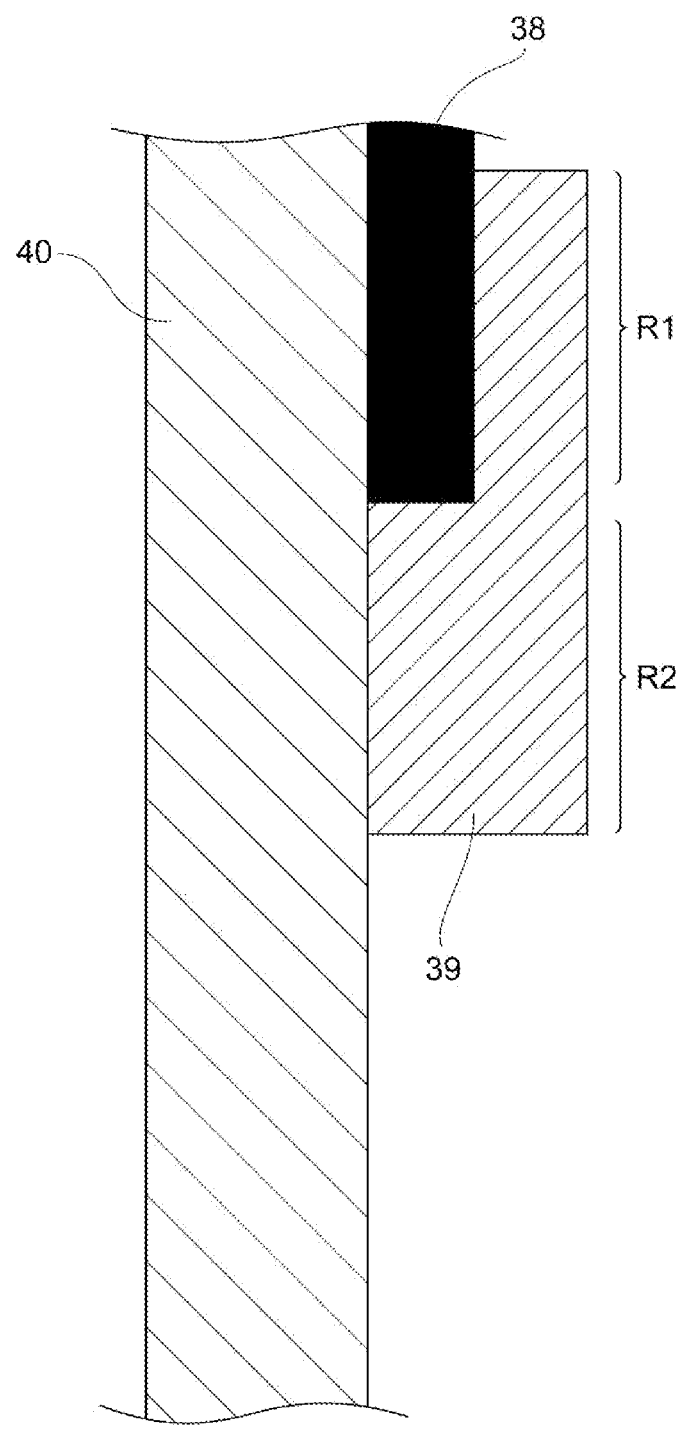

[Figure 6]
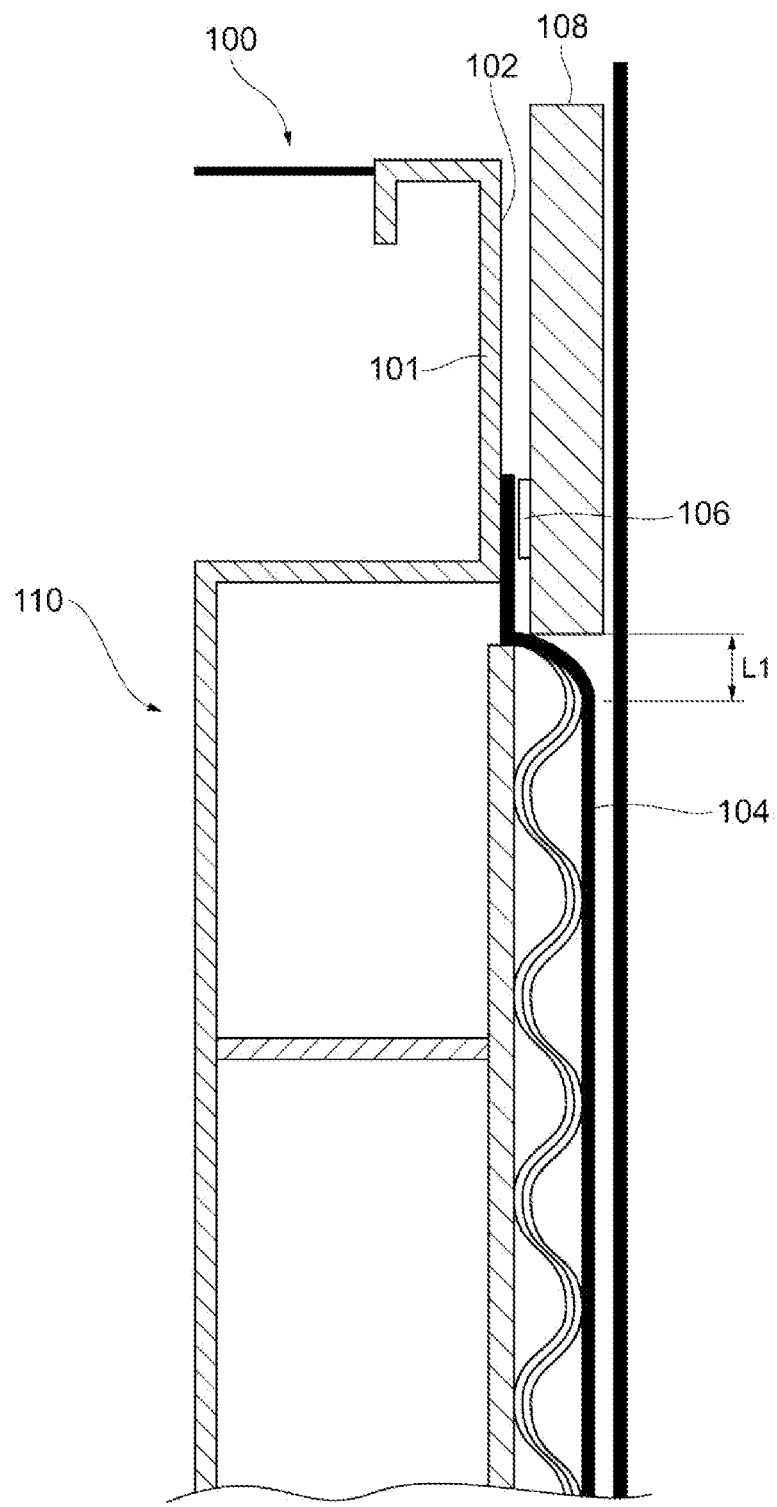

[Figure 7]
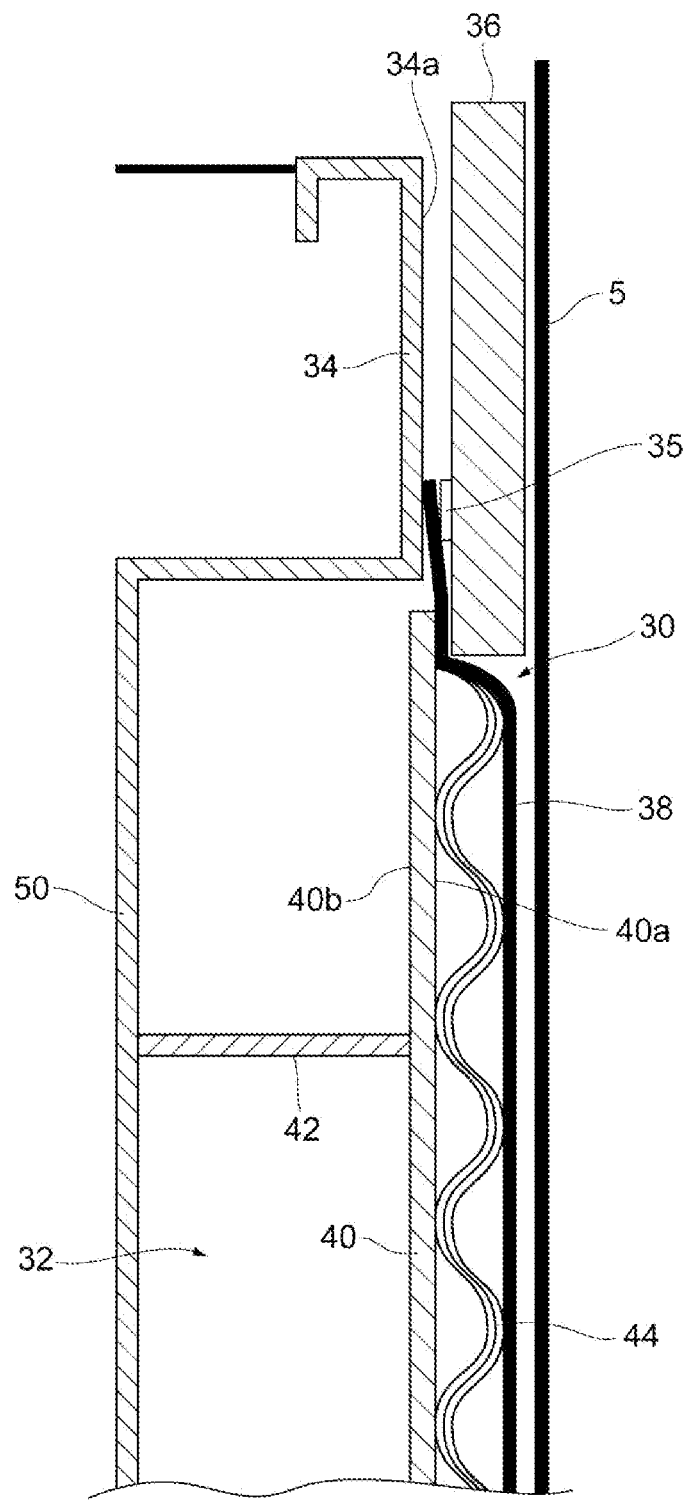

[Figure 8]
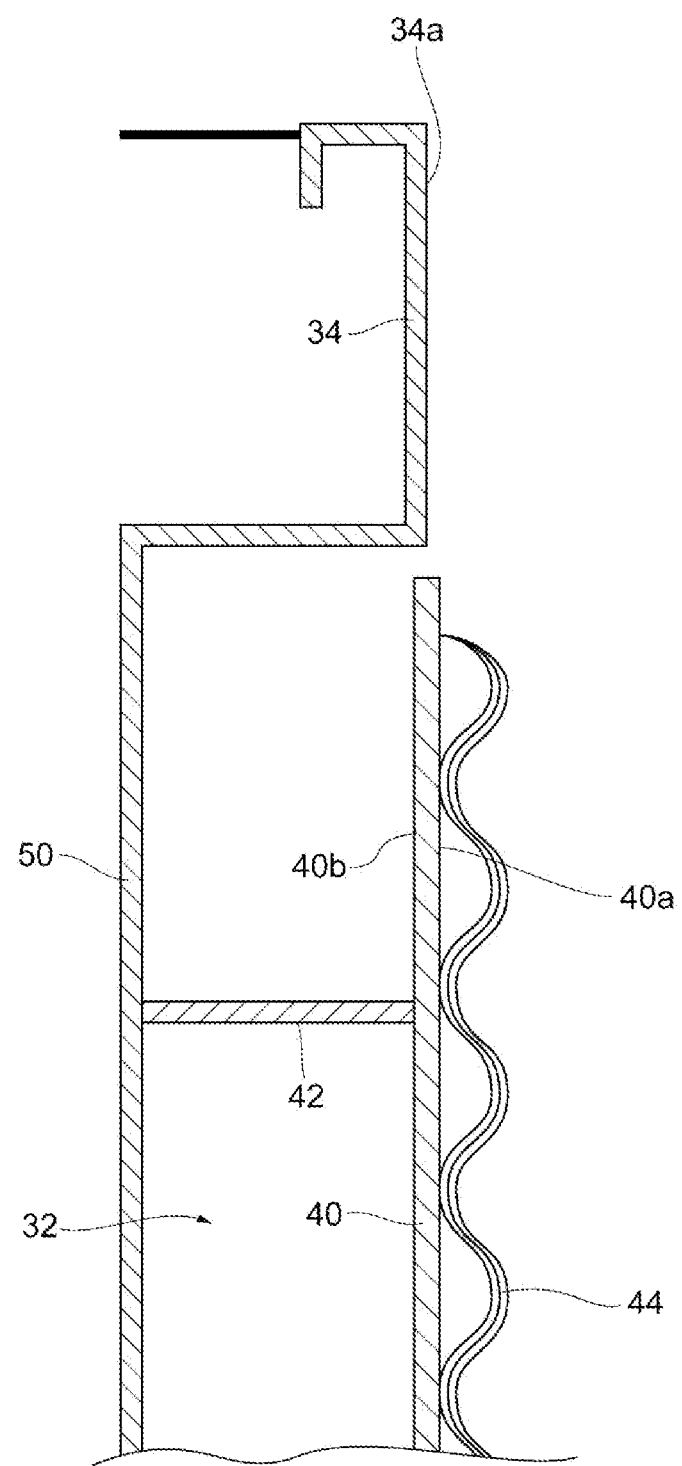

[Figure 9]
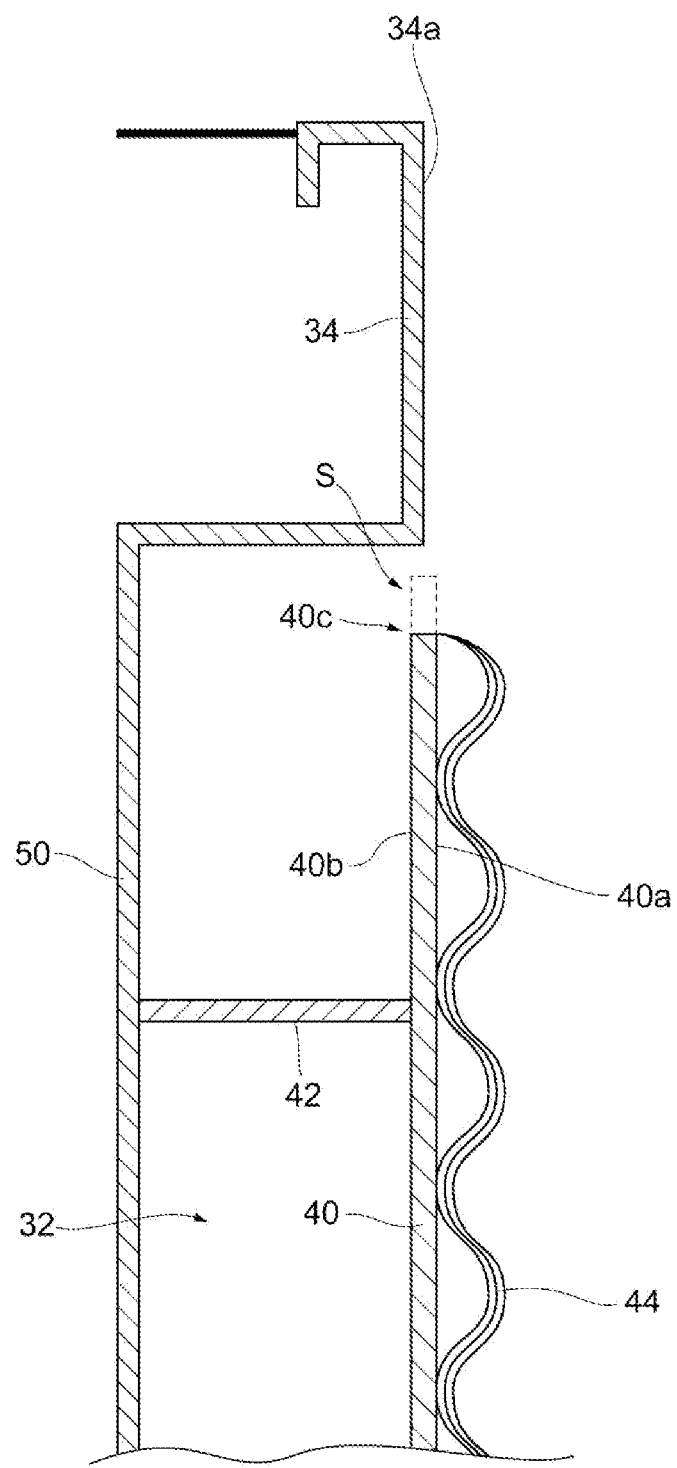

[Figure 10]
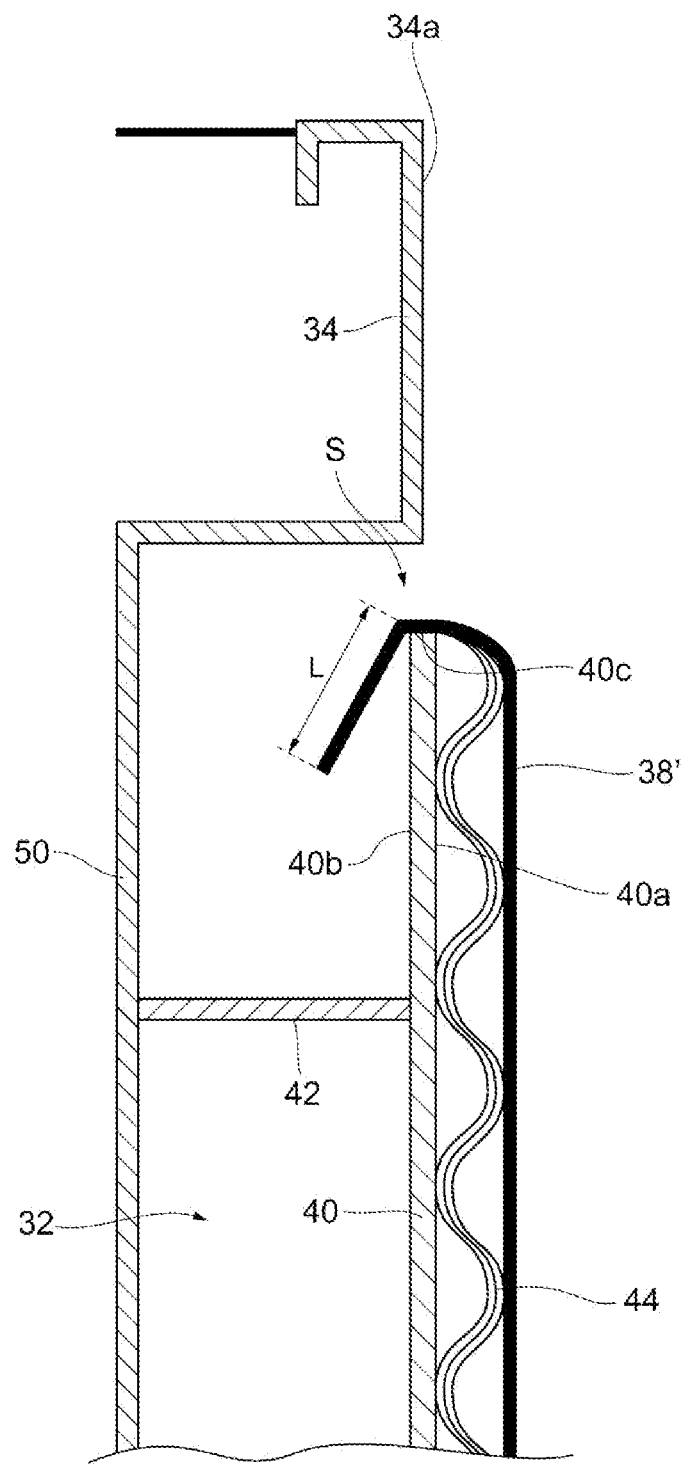

[Figure 11]
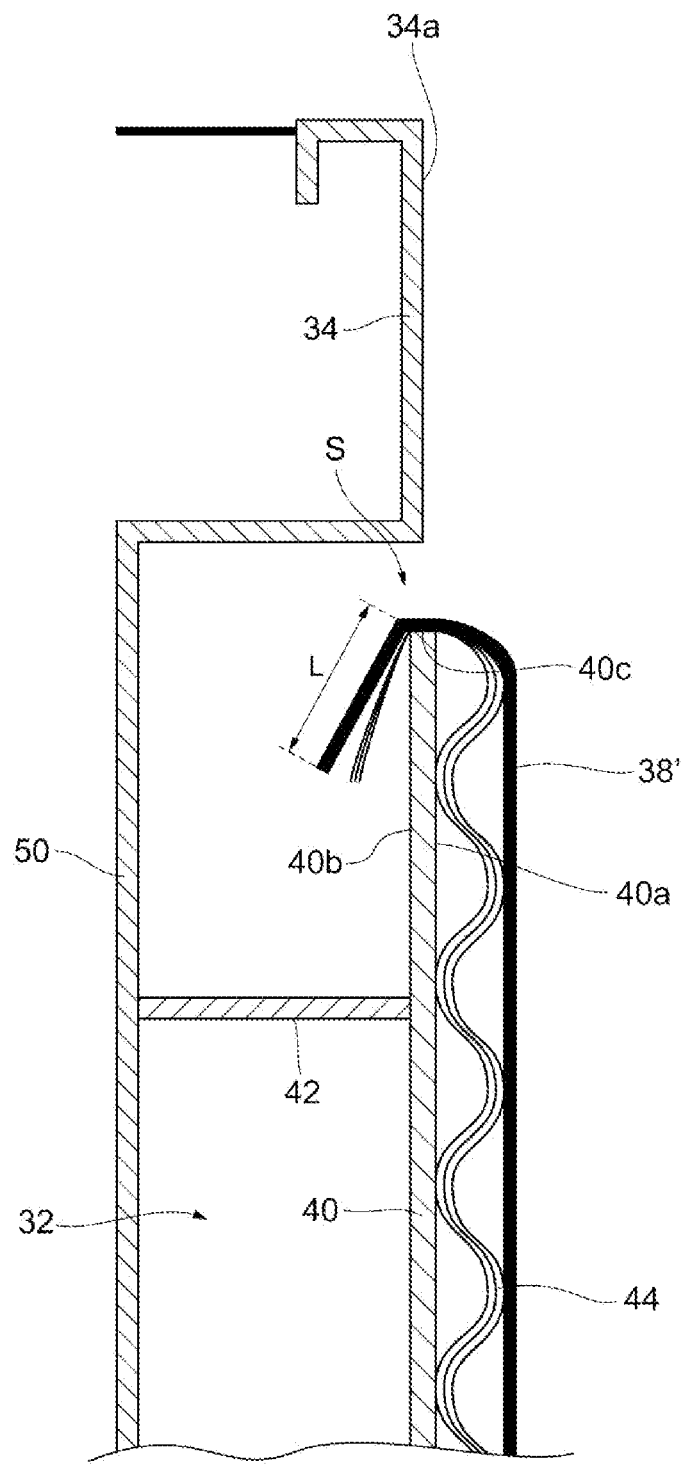

ELECTRODE STRUCTURE, METHOD FOR PRODUCING ELECTRODE STRUCTURE, ELECTROLYTIC CELL, AND ELECTROLYZER

TECHNICAL FIELD

The present invention relates to an electrode structure, a method for producing the electrode structure, an electrolytic cell, and an electrolyzer.

BACKGROUND ART

The alkali metal salt electrolysis is a method of electrolyzing an aqueous solution of an alkali metal chloride, such as saline solution, to produce high-concentration alkaline metal hydroxides, hydrogen, chlorine, and the like. Examples of the electrolysis method include mercury process and diaphragm process, and recently ion exchange membrane process have been mainly used because of their good electricity efficiency.

The ion exchange membrane process conducts electrolysis with an electrolyzer including many electrolytic cells arranged having ion exchange membranes therebetween, each of the electrolytic cells having an anode and a cathode (hereinafter, these are also collectively referred to as "electrodes"). Each electrolytic cell has a structure of a cathode chamber and an anode chamber that are disposed back to back via a partition wall (back plate), and a cathode is attached to the cathode chamber, and an anode is attached to the anode chamber. In the electrolytic cell, an aqueous solution of alkali metal chloride is supplied to the anode chamber, and an alkali metal hydroxide is supplied to the cathode chamber for electrolysis, so as to generate chlorine gas in the anode chamber and generate an alkali metal hydroxide and hydrogen gas in the cathode chamber.

Recent mainstream of the electrolysis is zero-gap electrolysis for further improvement in the power consumption rate, in which an ion exchange membrane and a cathode are in contact with each other for electrolysis. Patent Literature 1, for example, discloses the configuration of a zero-gap electrolytic cell. In a typical zero-gap electrolytic cell, a rib and an anode are disposed in the anode chamber, and a rib, a current collector (conductive plate), an elastic body (mattress) and a cathode are disposed in the cathode chamber. In the cathode chamber, the current collector, the elastic body, and the cathode are arranged in this order, and pressing the cathode with the cushioning mattress brings the cathode into contact with the ion exchange membrane during electrolysis. Hereinafter, the structure including the current collector, the elastic body, and the electrode may be simply referred to as an "electrode structure".

Patent Literature 2 discloses a method of using a Teflon (registered trademark) pin and a welding method as a conventionally known method for fixing a cathode. The welding method fixes the peripheral edge of the cathode to a seal surface of the cathode chamber frame by spot welding with nickel tape. Specifically, this method places the cathode on the seal surface of the cathode chamber frame, and places nickel tape on them for spot welding to fix the cathode.

CITATION LIST

Patent Literature

Patent Literature 1: JP 4453973 B
Patent Literature 2: JP 2010-111947 A

SUMMARY OF INVENTION

Technical Problem

The techniques described in Patent Literature 1 and Patent Literature 2 fix the cathode to the seal surface by spot welding with nickel tape, and have problems, such as corrosion of the seal surface of the cathode chamber frame, thinning of the seal surface during renewing of the cathode, and poor work efficiency.

A gasket is attached to the seal surface at a position corresponding to the outer periphery of the electrolytic cell to prevent the contents from leaking. In this case, as illustrated in FIG. 6, the cathode 104 and the nickel tape 106 are attached for fixing on the seal surface 102 of the electrolytic cell 100, and so unevenness occurs there. Electrolysis solution easily accumulates in the vicinity of this unevenness, and the seal surface 102 may be corroded (crevice corrosion) depending on the conditions. If the gasket deteriorates as electrolysis progresses, the gasket has to be replaced to maintain the sealability. In the electrolytic cell illustrated in FIG. 6, when the gasket is replaced, the nickel tape 106 may be peeled off together with the gasket 108, and this may tear the cathode 104. This leads to damage inside the electrolytic cell.

If the electrode deteriorates as the electrolysis progresses, the electrode has to be replaced to solve the deterioration of the electrolytic performance. To replace the cathode 104, the old cathode 104 is peeled off, the seal surface 102 of the frame 101 of the cathode chamber 110 is washed, and a new cathode is fixed on the seal surface 102 by spot welding with nickel tape 106. Before fixing by welding, oxides on the surface layer of the seal surface 102 have to be removed. To remove the oxides, the surface layer of the seal surface 102 has to be removed, and this leads to thinning of the seal surface 102. When such an operation is repeated, the deterioration of sealability due to the thinning may become apparent. In this way, the conventional method has a problem that it takes much time and labor to replace the cathode.

As described above, the conventional technique still has to be improved in terms of preventing damage inside the electrolytic cells during replacement of the components, such as electrodes, and preventing crevice corrosion on the seal surface.

In view of the above problems, the present invention has a first object to provide an electrode structure capable of reducing corrosion and damage inside an electrolytic cell, and an electrolytic cell and an electrolyzer including the electrode structure.

The present invention has a second object to provide a method for producing an electrode structure capable of reducing damage inside an electrolytic cell during replacement of the components, such as an electrode.

Solution to Problem

The present inventors have conducted extensive studies to solve the above problems. As a result, the present inventors have found the solution for the first object by fixing the edge of the electrode (by making it have a predetermined shape) with using an electrode fixing member, and have achieved the present invention. The present inventors further have found the solution for the second object by predetermined steps of cutting at least a part of the peripheral edge of the current collector and bending at least a part of the peripheral edge of the electrode, and have achieved the present invention.

That is, the present invention is as follows.

[1] An electrode structure comprises:
an electrode;
a current collector facing the electrode;
an elastic body located between the electrode and the current collector the elastic body having conductivity; and
an electrode fixing member located between the elastic body and the current collector,
wherein at least a part of a peripheral edge of the electrode is fixed between the electrode fixing member and the current collector.

[2] The electrode structure according to [1], wherein an entire peripheral edge of the electrode is fixed between the electrode fixing member and the current collector.

[3] The electrode structure according to [1] or [2], wherein a partial length of the electrode located between the electrode fixing member and the current collector is 5 mm or more and 30 mm or less.

[4] An electrolytic cell comprises:
a cathode chamber;
a partition wall facing the cathode chamber; and
an anode chamber facing the partition wall, the anode chamber being located on an opposite side of the cathode chamber,
wherein at least one of the cathode chamber and the anode chamber comprises the electrode structure according to any one of [1] to [3].

[5] An electrolyzer comprises: the electrolytic cell according to [4]; and an ion exchange membrane facing the electrolytic cell.

[6] A method for producing an electrode structure, comprising:
a first step of removing a first electrode from a structure comprising the first electrode, a current collector facing the first electrode, and a first elastic body located between the first electrode and the current collector, the first elastic body having conductivity;
a second step of placing a second electrode on the current collector; and
a third step of bending at least a part of a peripheral edge of the second electrode over the current collector, followed by fixing at least a part of a bent section of the second electrode to the current collector with an electrode fixing member.

[7] The method for producing the electrode structure according to [6], wherein the first elastic body is further removed in the first step, and
a second elastic body is placed on the current collector, followed by placing the second electrode on the current collector, in the second step.

[8] A method for producing an electrode structure, comprising:
a removal step of removing a first electrode from a structure comprising the first electrode, a current collector having a first face facing the first electrode and a second face on an opposite side of the first face, and an elastic body located between the first electrode and the first face of the current collector, the first elastic body having conductivity;
a cutting step of cutting at least a part of a peripheral edge of the current collector to thereby form a cut-out inside the structure; and
a bending step of placing a second electrode on the elastic body, followed by bending the second electrode so that at least a part of a peripheral edge of the second electrode is located over the second face via the cut-out.

[9] The method for producing the electrode structure according to [8], wherein the elastic body is bent so that at least a part of a peripheral edge of the elastic body is located over the second face via the cut-out in the bending step.

[10] The method for producing the electrode structure according to [8] or [9], wherein the structure further includes a flange that adheres to the first electrode via an adhesive member, and
the adhesive member is removed to thereby separate the first electrode from the flange in the removal step.

Advantageous Effects of Invention

The present invention provides an electrode structure capable of reducing corrosion and damage inside an electrolytic cell, and an electrolytic cell and an electrolyzer including the electrode structure. The present invention provides a method for producing an electrode structure capable of reducing damage inside an electrolytic cell during replacement of the components, such as an electrode.

BRIEF DESCRIPTION OF DRAWINGS

FIG. 1 illustrates a front view schematically illustrating an electrolyzer according to one embodiment of the present invention.

FIG. 2 illustrates a front view illustrating an electrolytic cell according to one embodiment of the present invention.

FIG. 3 illustrates a cross-sectional configuration of the electrolytic cell shown in FIG. 2.

FIG. 4 illustrates an enlarged cross-sectional view illustrating a part of the electrolytic cell shown in FIG. 3.

FIG. 5 illustrates an enlarged cross-sectional view illustrating a part of the electrolytic cell shown in FIG. 4.

FIG. 6 illustrates a cross-sectional configuration of a conventional electrolytic cell.

FIG. 7 illustrates an enlarged cross-sectional view illustrating a part of the electrolytic cell (before performing removal step) shown in FIG. 3.

FIG. 8 illustrates an enlarged cross-sectional view illustrating a part of the electrolytic cell (after performing removal step and before performing cutting step) shown in FIG. 3.

FIG. 9 illustrates an enlarged cross-sectional view illustrating a part of the electrolytic cell (after performing cutting step and before performing bending step) shown in FIG. 3.

FIG. 10 illustrates an enlarged cross-sectional view illustrating a part of the electrolytic cell (after performing bending step according to one embodiment) shown in FIG. 3.

FIG. 11 illustrates an enlarged cross-sectional view illustrating a part of the electrolytic cell (after performing bending step according to another embodiment) shown in FIG. 3.

DESCRIPTION OF EMBODIMENTS

Hereinafter, an embodiment for carrying out the present invention (hereinafter, simply referred to as the "present embodiment") will be described in detail. The present embodiment described below explains the present invention by way of an example, and is not intended to limit the present invention to the following contents. The present invention can be appropriately modified and implemented within the scope of the gist.

Like reference numerals designate like parts throughout the drawings to omit their duplicated descriptions. Unless otherwise specified, the positional relationship, such as up and down and left and right, in the drawings is based on the positional relationship in the drawings, and the scales of the drawings are not limited to the illustrated ratio. The drawings are merely one example of the present embodiment, and the present embodiment should not be construed as being limited thereto.

First Embodiment

[Electrode Structure]

The electrode structure of the present embodiment includes: an electrode; a current collector facing the electrode; an elastic body located between the electrode and the current collector, the elastic body having conductivity; and an electrode fixing member located between the elastic body and the current collector, wherein at least a part of a peripheral edge of the electrode is fixed between the electrode fixing member and the current collector.

As described above, the electrode structure of the present embodiment is configured so that at least a part of the peripheral edge of the electrode is bent toward between the electrode fixing member and the current collector. With this configuration, the electrode can be fixed to the current collector without welding as in FIG. 6, and so this effectively prevents crevice corrosion of the seal surface due to the accumulation of electrolysis solution.

As described above, the electrode structure of the present embodiment reduces corrosion and damage inside the electrolytic cell.

The electrolytic cell of the present embodiment includes the electrode structure of the present embodiment. That is, the electrolytic cell of the present embodiment includes: a cathode chamber, a partition wall facing the cathode chamber; and an anode chamber facing the partition wall and located on an opposite side of the cathode chamber. At least one of the cathode chamber and the anode chamber includes the electrode structure of the present embodiment. With this configuration, the electrolytic cell of the present embodiment generates less internal corrosion and damage.

The electrolyzer of the present embodiment includes: the electrolytic cell of the present embodiment; and an ion exchange membrane facing the electrolytic cell. With this configuration, the electrolyzer of the present embodiment generates less internal corrosion and damage.

The following describes the configuration of the electrode structure of the present embodiment in detail, while considering the relationship with the configurations of the electrolytic cell and the electrolyzer including the electrode structure.

FIG. 1 illustrates a front view schematically illustrating an electrolyzer according to one aspect of the present embodiment. As illustrated in FIG. 1, the electrolyzer 1 is a bipolar ion exchange membrane type electrolyzer, and the electrolyzer 1 includes a plurality of electrolytic cells 3 connected in series by a presser 7 through ion exchange membranes 5 (see FIG. 4). In the electrolyzer 1, one of the electrolytic cells 3 located at both ends connects to an anode terminal 9, and the other electrolytic cell 3 connects to a cathode terminal 11.

For electrolysis in the electrolyzer 1, the ion exchange membrane 5 separates the anode chamber 22 (see FIG. 3) described later of one electrolytic cell 3 from the cathode chamber 32 (see FIG. 3) in the adjacent electrolytic cell 3. In one example, sodium ions move from the anode chamber 22 of the electrolytic cell 3 through the ion exchange membrane 5 to the cathode chamber 32 of the adjacent electrolytic cell 3, and the current during electrolysis flows along the direction of the electrolytic cells 3 connected in series.

The ion exchange membrane 5 is not particularly limited, which may be a known ion exchange membrane. For example, when chlorine and alkali are produced by electrolysis of alkali chloride, a fluorine-containing ion exchange membrane is preferable from the viewpoint of excellent heat resistance and chemical resistance. Examples of the fluorine-containing ion exchange membrane include those having a function of selectively permeating cations generated during electrolysis and containing a fluorine-containing polymer having an ion exchange group. The fluorine-containing polymer having an ion exchange group refers to a fluorine-containing polymer having an ion exchange group or an ion exchange group precursor that can be an ion exchange group through hydrolysis. In one example, this includes a polymer which is composed of a main chain of a fluorinated hydrocarbon, has a functional group capable of being converted into an ion exchange group through hydrolysis or the like as a pendant side chain, and can be melt-processed.

Next the following describes the electrolytic cell 3 in detail. FIG. 2 illustrates a front view illustrating an electrolytic cell according to one aspect of the present embodiment, viewed from the cathode side. FIG. 3 illustrates a cross-sectional configuration of the electrolytic cell in FIG. 2. A rib (support) 42 is omitted in FIG. 3. FIG. 4 illustrates an enlarged cross-sectional view illustrating a part of the electrolytic cell shown in FIG. 3. As illustrated in these drawings, the electrolytic cell 3 includes an anode section 20, a cathode section 30, and a partition wall 50 that separates the anode section 20 and the cathode section 30 (the anode chamber 22 and the cathode chamber 32). The anode section 20 and the cathode section 30 are electrically connected. The electrolytic cell 3 is a zero-gap electrolytic cell.

The anode section 20 has the anode chamber 22. The anode chamber 22 is defined by a frame 24. A gasket 26 is placed on the surface of an upper part of the frame 24. The anode chamber 22 includes an anode 28. The anode 28 is placed on one side face of the electrolytic cell 3. The anode 28 is placed on one side face of the electrolytic cell 3, and may include a metal electrode such as a DSA, in which a surface of a titanium base material is coated with an oxide containing ruthenium or iridium.

The cathode section 30 has the cathode chamber 32. The cathode chamber 32 is defined by a frame 34. A gasket 36 is placed on the surface (seal surface) 34a of an upper part of the frame 34. The cathode chamber 32 includes a cathode 38, a current collector 40, a rib (support) 42, and a mattress (elastic body having conductivity) 44.

The cathode 38 is placed on the other side face of the electrolytic cell 3. Preferably the cathode 38 that can be used in zero-gap electrolytic cells has a small wire diameter and a small number of meshes because such a cathode has good flexibility. The cathode may be formed of a commonly available base material. In one example, the cathode 38 may have a wire diameter of 0.1 mm to 0.5 mm and sieve opening of about 20 to 80 meshes.

The cathode is preferably coated with a thin layer of a precious metal or a precious metal oxide, and the coating may include a rare earth component in addition to the precious metal. A small thickness of the coating is preferable because it keeps the cathode flexible enough and so tends to be able to protect the ion exchange membrane 5 from local damage. For a thinner coating, the coating made of a precious metal being highly active or of a precious metal oxide is preferable. The thickness of the coating layer is preferably 0.5 μm to 50 μm, more preferably 1 μm to 10 μm.

As illustrated in FIG. 4, the current collector 40 is placed along the cathode 38. The current collector 40 enhances the current collecting effect of the cathode 38. The current collector 40 has a pair of a surface (first face) 40a and a rear face (second surface) 40b facing each other. The current collector 40 is placed so that the surface 40a faces the cathode 38.

The current collector 40 conducts electricity to a mattress 44 and the cathode 38, and supports the load applied from the mattress 44 and the cathode 38. The current collector 40 also has a function of passing hydrogen gas generated from the cathode 38 toward the partition wall 50. In view of this, the current collector 40 is preferably expanded metal, a punched perforated plate or the like. An opening percentage of the pores of the current collector 40 is preferably more than 40% to let hydrogen gas generated from the cathode 38 pass toward the partition wall 50. Examples of the material of the current collector 40 include nickel, nickel alloy, stainless steel and iron from the viewpoint of corrosion resistance, and nickel is preferable from the viewpoint of conductivity. For the current collector 40, a cathode of a finite gap electrolytic cell may be used as it is. For the current collector 40, a cathode for finite gap including expanded metal coated with nickel oxide by plasma spraying may be used.

The rib 42 is located in the cathode chamber 32, and is placed between the partition wall 50 and the rear face 40b of the current collector 40. The rib 42 supports and fixes the current collector 40. The rib 42 is welded to the partition wall 50 and to the current collector 40 for fixing.

The mattress 44 is placed between the cathode 38 and the surface 40a of the current collector 40. The zero-gap electrolytic cell 3 is configured so that the anode 28 has high rigidity to suppress the deformation even when being pressed by the ion exchange membrane 5. On the other hand, the cathode 38 of the electrolytic cell 3 has a flexible structure to absorb the unevenness due to the manufacturing accuracy tolerance of the electrolytic cell 3 and the deformation of the electrode and so keep the zero gap. The mattress 44 is used to let the cathode 38 have a flexible structure.

The mattress 44 functions to transmit electricity to the cathode 38 and to pass the hydrogen gas generated from the cathode 38 toward the current collector 40. The mattress 44 applies moderate and uniform pressure to the cathode 38 in contact with the ion exchange membrane 5 so as not to damage the ion exchange membrane 5. This allows the cathode 38 in close contact with the ion exchange membrane 5.

The mattress 44 may be a conventionally known one. Preferably the wire diameter of the mattress 44 is 0.05 mm or more and 0.25 mm or less. The wire diameter of the mattress 44 being 0.05 mm or more suppresses crushing of the mattress, and the wire diameter of the mattress 44 being 0.25 mm or less tends to lead to a preferable range of the elastic force of the mattress 44 and a suppression of an excessive increase in the pressure during the electrolysis. Such a mattress 44 affects less the performance of the ion exchange membrane 5. More preferably, the mattress has a wire diameter of 0.08 mm or more and 0.20 mm or less. The mattress 44 may be made of nickel from the viewpoint of conductivity and alkali resistance. In one example, a woven nickel wire having a wire diameter of about 0.1 mm may be corrugated.

The partition wall 50 is placed between the anode chamber 22 and the cathode chamber 32 (the anode section 20 and the cathode section 30). The partition wall 50 may be referred to as a separator, and partitions the anode chamber 22 and the cathode chamber 32. The partition wall 50 may be a known one as a separator for electrolysis, and in one example, the separator may include a nickel plate on the cathode side that is welded to a titanium plate on the anode side.

Next the following describes a mounting structure and a mounting method of the cathode 38 in detail. As illustrated in FIG. 4, the cathode 38 has an upper end (a part of the peripheral edge) that is bent toward between the surface 40a of the current collector 40 (the surface facing the cathode 38) and the electrode fixing member 39. Specifically, the upper end of the cathode 38 is bent over the surface 40a of the current collector 40, and is fixed to the current collector 40 by the electrode fixing member 39 from its above. As illustrated in FIG. 5, which illustrates an enlarged view of the vicinity of the portion R surrounded by the dotted line in FIG. 4, the electrode fixing member 39 on the current collector 40 is not fixed in region R1, and is fixed to the current collector 40 in region R2. In region R1, a gap can be defined between the electrode fixing member 39 and the current collector 40, and the bent peripheral end of the cathode 38 can be physically fixed in this gap. The shape of the electrode fixing member is not limited to the example illustrated in FIG. 5 and may be any shape as long as the cathode 38 can be bent toward the region where the current collector and the electrode fixing member are not fixed.

In order to avoid crevice corrosion that may occur in the conventional techniques of fixing the peripheral edge of the cathode to the seal surface of the cathode chamber frame by spot-welding, at least a part of the peripheral edge of the cathode may be bent toward the opposite side of the cathode beyond the edge of the current collector (see the second embodiment described later). Typically, the gap between the current collector and the flange in the electrolytic cell is very narrow, and for example, the distance between the current collector and the flange is 2 mm or less. Therefore, bending the electrode in the aforementioned manner requires the formation of a cut-out at least at a part of the peripheral edge of the current collector by processing, such as cutting. The configuration of the electrode structure of the present embodiment allows the cathode 38 to fix to the current collector 40 without spot-welding of the peripheral edge of the cathode on the seal surface of the cathode chamber frame or cutting at least a part of the peripheral edge of the current collector. Therefore, the present embodiment can prevent the problems of damage inside the electrolytic cell due to crevice corrosion on the seal surface of the cathode chamber frame and generation of metal scraps.

Furthermore, a typical zero-gap electrolyzer has a region where the distance between the electrode and the ion exchange membrane is larger at the peripheral edge of the electrode than that in the central portion of the electrode, that is, where the distance between the ion exchange membrane and the electrode is large. (see L1 in FIG. 6). In the present embodiment, because of the thickness of the electrode fixing member, the thickness of the electrode and the elastic body at the peripheral edge is ensured sufficiently, so that the region having a larger distance between the ion exchange membrane and the electrode is reduced (see L2 in FIG. 4). That is, provided that the scales of FIGS. 4 and 6 are the same, L1>L2 is satisfied. As a result, the zero gap can be favorably maintained, and this prevents membrane damage and improves the electrolysis performance. The thickness here means the thickness in the direction from the current collector to the ion exchange membrane.

The fixing method is not particularly limited, which may be welding, for example.

Examples of the material of the electrode fixing member 39 include, but are not limited to, nickel, nickel alloy, stainless steel and iron from the viewpoint of corrosion resistance, and expanded metal coated with nickel oxide by plasma spraying may be used.

The electrode fixing member 39 preferably has a thickness of 0.2 to 1.0 mm, and more preferably 0.4 to 0.8 mm. When the thickness of the electrode fixing member 39 is 0.2 mm or more, the cathode 38 and the mattress 44 can be sufficiently thick at the peripheral edge, and as a result, there is a tendency that the zero gap can be favorably maintained. This further prevents membrane damage and improves the electrolysis performance. When the thickness of the electrode fixing member 39 is 1.0 mm or less, this prevents excessive pressing of the cathode 38 against the ion exchange membrane 5, and so there is a tendency that membrane damage is reduced.

In order to implement the above structure, the cathode 38 is preferably cut to a size slightly larger than the conducting portion of the electrolytic cell 3 and then mounted. Note here that the dimension (bending length L3) of the portion of the cathode 38 that is located between the surface 40a of the current collector 40 and the electrode fixing member 39 (the portion longer than the conducting portion) is preferably 5 mm or more and 30 mm or less, and more preferably 8 mm or more and 25 mm or less. When the bending length L3 is 30 mm or less, there is a tendency that the inserted portion of the cathode 38 and the mattress 44 can be sufficiently fixed to the current collector 40. When the bending length L3 is 5 mm or more, there is a tendency that the cathode 38 and the mattress 44 hardly come off from the current collector 40. Specifically the bending length L3 is specified as the shortest distance from the edge 40c to the ends of the cathode 38 and the mattress 44.

FIG. 4 illustrates the configuration of the upper portion of the cathode 38, and the lower end of the cathode 38 may also be bent over the surface 40a of the current collector 40 and fixed by another electrode fixing member. That is, both ends (the entire peripheral edge) of the cathode 38 may be bent over the surface 40a of the current collector 40 and fixed by another electrode fixing member. With this configuration, the cathode 38 can be more firmly fixed to the current collector 40, and sagging of the mattress 44 can be prevented more effectively. More preferably, the entire outer peripheral edge of the cathode 38 may be bent over the surface 40a of the current collector 40, and the cathode 38 may be fixed by the electrode fixing members, so that the cathode 38 can be more firmly fixed to the current collector 40.

To fix the cathode 38 to the current collector 40, the corner of the cathode 38 is preferably cut out. This enables the cut-out corner of the cathode 38 to be inserted. A cut-out may be formed diagonally at the corner (a linear cut-out from the corner in the in-plane direction of the cathode) for insertion. Such cutting, however, tends to cause a tear of the cathode 38 from the cutting easily, and so it is preferable to cut out the corner as described above.

For a jig for bending the cathode 38 over the surface 40a of the current collector 40, various known jigs may be used. Specifically, the end of the cathode 38 can be bent over the surface 40a of the current collector 40 with a spatula or a rotary roller. From the viewpoint of workability, the jig for bending the cathode 38 is preferably a rotary roller. The blade thickness of the rotary roller is preferably 0.2 mm or more. When the thickness is 0.2 mm or more, the blade tends to have a sufficient rigidity and be easy to bend the cathode 38. The diameter of the rotary roller is not particularly limited, and typically the rotary roller with a diameter of about 100 mm is easy to operate.

The above describes the electrode structure for the cathode (that is, the cathode structure), and the electrode of the present embodiment may be the anode. That is, the electrode structure of the present embodiment can be applied to the anode chamber as the anode structure. In this case, various known components may be used as the anode chamber, and various known components may be also used as the anode.

[Method for Producing Electrode Structure]

A method for producing an electrode structure according to the present embodiment includes: a first step of removing a first electrode from a structure including the first electrode, a current collector facing the first electrode, and a first elastic body located between the first electrode and the current collector, the first elastic body having conductivity; a second step of placing a second electrode on the current collector; and a third step of bending at least a part of a peripheral edge of the second electrode over the current collector, followed by fixing at least a part of the bent section of the second electrode to the current collector with an electrode fixing member. With this configuration, the method for producing an electrode structure according to the present embodiment enables production of an electrode structure capable of reducing corrosion and damage inside the electrolytic cell.

The first step of the present embodiment removes a first electrode from a structure including the first electrode, a current collector facing the first electrode, and a first elastic body located between the first electrode and the current collector, the first elastic body having conductivity.

The first electrode in this embodiment may be a cathode or an anode. The first electrode may be the cathode or the anode described in the electrode structure of the present embodiment as appropriate.

The current collector and the first elastic body in the present embodiment also may be the current collector and the elastic body described in the electrode structure of the present embodiment as appropriate.

The method of removing the first electrode is not particularly limited, and various known methods can be used. In one example of the structure configured as in FIG. 6, a cathode 104 adheres to a seal surface 102 at a part corresponding to the outer peripheral of the electrolytic cell via an adhesive member (nickel tape) 106, to which a gasket 108 further adheres to prevent the contents from leaking. When the structure according to the present embodiment is configured like this, that is, when the structure further includes a flange (frame) 101 that adheres to the first electrode via the adhesive member 106, the first step preferably removes the adhesive member 106 to separate the cathode 104 from the flange 101. Specifically this separation can be performed by firstly cutting a plurality of welding points between the nickel tape and the flange with a spatula, for example, to remove the adhesive member 106.

In the first step, not only the first electrode but also the first elastic body may be removed together for replacement. In this context, the welded portion between the first elastic body and the current collector may be cut, for example, to remove the first elastic body.

The second step of the present embodiment places the second electrode on the current collector. The second electrode in the present embodiment is a cathode when the first electrode is a cathode, and is an anode when the first electrode is an anode. Similarly to the first electrode, the second electrode also may be the cathode or the anode described in the electrode structure of the present embodiment as appropriate.

The method for placing is not particularly limited as long as it enables the implementing of the subsequent third step. When the first elastic body also is removed in the first step, the second step preferably places a second elastic body on the current collector, and then places the second electrode on the current collector.

The third step of the present embodiment bends at least a part of a peripheral edge of the second electrode over the current collector, and fixes at least a part of the bent section of the second electrode to the current collector with an electrode fixing member. The bent section means a part of the peripheral edge of the second electrode from the beginning of the bending to the edge. The electrode fixing member in the present embodiment may be the electrode fixing member described in the electrode structure of the present embodiment as appropriate.

The fixing method is not particularly limited, which may be welding, for example. In a specific example of fixing by welding as illustrated in FIG. 4, the electrode fixing member 39 is placed at the peripheral edge of the current collector 40 (that is, close to the edge 40c of the current collector 40), and spot welding is performed there to fix the current collector 40 and the electrode fixing member 39. Although not limited to the following, the fixing is preferably performed as follows. That is, the end of the electrode fixing member 39 on the opposite side of the edge 40c of the current collector 40 (close to the center of the current collector 40 in the plane direction) is welded for fixing. This operation may result in forming some space at a non-spot-welded portion between the electrode fixing member 39 and the current collector 40, and the bent section of the cathode 38 at the end may be guided toward this space for insertion. In this way, the cathode 38 can be physically fixed between the electrode fixing member 39 and the current collector 40. More specifically, as in FIG. 5 illustrating the vicinity of the region R surrounded by the dashed line of FIG. 4 in a zoomed-in view, the electrode fixing member 39 placed on the current collector 40 is not fixed in region R1 but is fixed to the current collector 40 in region R2. This defines the space between the electrode fixing member 39 and the current collector 40 in region R1, and the bent peripheral end of the cathode 38 can be inserted into the space, so that the cathode 38 can be physically fixed there. The positioning of regions R1 and R2 is not particularly limited, and can be appropriately adjusted in consideration of the bending length of the cathode 38, the material of the electrode fixing member 39, and the like. The shape of the electrode fixing member is not limited to a substantially L-shape illustrated in FIG. 5, and another shape such as like a flat plate can be appropriately used.

Second Embodiment

[Method for Producing Electrode Structure]

A method for producing an electrode structure according to the present embodiment (for convenience of description, hereinafter, also referred to as "second producing method") includes: a removal step of removing a first electrode from a structure including the first electrode, a current collector having a first face facing the first electrode and a second face on an opposite side of the first face, and an elastic body located between the first electrode and the first face of the current collector, the elastic body having conductivity; a cutting step of cutting at least a part of a peripheral edge of the current collector to thereby form a cut-out inside the structure; and a bending step of placing a second electrode on the elastic body, followed by bending the second electrode so that at least a part of a peripheral edge of the second electrode is located over the second face via the cut-out.

With this configuration, the method for producing an electrode structure according to the present embodiment easily produces an electrode structure (for convenience of description, the following refers to an electrode structure according to Second embodiment as "second electrode structure", and refers to an electrode structure according to First embodiment as stated above as "first electrode structure"). Also, the method reduces damage inside an electrolytic cell during replacement of the components, such as an electrode. That is, when replacing the components of the existing electrode, elastic body or current collector in the existing electrolytic cell (hereinafter, the existing electrode structure is simply referred to as a "structure"), they can be replaced with simple operations, and damage inside the electrolytic cell also can be reduced.

The following describes the configuration of the second electrode structure in detail, while considering the relationship with the configurations of the electrolytic cell and the electrolyzer including the electrode structure. The electrolytic cell and the electrolyzer including the second electrode structure are the same as those in First embodiment (FIGS. 1 to 3) except that the second electrode structure is used instead of the first electrode structure, and the description is omitted here. Components of the electrolytic cell and the electrolyzer, such as a cathode, an anode, a current collector and a mattress that can be used in Second embodiment are also the same as those in First embodiment, and the components made of the materials and the shapes described in First embodiment can be used for Second embodiment.

The following describes the steps in the second producing method.

(Removal Step)

The structure of the present embodiment includes a first electrode, a current collector having a first face facing the first electrode and a second face on an opposite side of the first face, and an elastic body located between the first electrode and the first face of the current collector and having conductivity, and this structure represents the state of the structure before the removal step of the present embodiment. In the example of FIG. 7, the electrode structure of the present embodiment is configured to include, but is not limited to, a cathode 38 that adheres to a seal surface 34a at a part corresponding to the outer peripheral of the electrolytic cell via an adhesive member (nickel tape) 35, to which a gasket 36 further adheres to prevent the contents from leaking. When the electrode structure according to the present embodiment is configured like this, that is, when the structure further includes a flange (frame) 34 that adheres to the existing electrode via the adhesive member 35, the removal step preferably removes the adhesive member 35 to separate the cathode 38 from the flange 34. Specifically this separation can be performed by firstly cutting a plurality of welding points between the nickel tape and the flange with a spatula, for example, to remove the adhesive member 35.

FIG. 8 illustrates the configuration after the removal step is performed to the example of FIG. 7. The mattress 44 may further be removed from the state of FIG. 8 for replacement.

Specifically, the welded portion between the mattress and the current collector may be cut, for example, to remove the mattress 44.

(Cutting Step)

A cutting step is performed after the removal step of the present embodiment, i.e., to the state illustrated in FIG. 8. As illustrated in FIG. 9, the cutting step cuts and removes at least a part of a peripheral edge of the current collector 40 to thereby form a cut-out S inside the structure. In FIG. 9, the section indicated by the dashed line of the current collector 40 corresponds to the cut portion. This cutting step shortens the initial edge portion of the current collector 40 to the position of the edge 40c, whereby the cut-out S is formed.

From the viewpoint of ease of the subsequent bending step, the length of the cut-out S represented by the shortest distance from the edge 40c of the current collector 40 to the flange 34 is preferably 3 to 10 mm, and more preferably 4 to 7 mm. This gap S of 3 mm or more tends to be able to easily insert the cathode 38 and the mattress 44 into the gap. The gap S of 10 mm or less effectively prevents the ion exchange membrane 5 from falling into the gap due to the contraction of the ion exchange membrane 5. As a result, this tends to be able to effectively suppress damage to the ion exchange membrane 5.

(Bending Step)

A bending step is performed after the cutting step of the present embodiment, i.e., to the state illustrated in FIG. 9. As illustrated in FIG. 10, the bending step places a cathode 38' on the mattress 44, and bends at least a part of a peripheral edge of the cathode 38' to be located over the rear face (second face) 40b via the cut-out S. When the mattress 44 has been removed for replacement from the state of FIG. 8, another mattress may be placed on the current collector 40, and then the cathode 38' may be placed on the mattress. When placing another mattress, the mattress may be fixed to the current collector 40 by spot welding. Alternatively, as described later, the bending step may be performed to the mattress together with the cathode 38' to fix the mattress to the current collector 40 as well (see FIG. 11). After this operation, the upper end (a part of the peripheral edge) of the cathode 38' is bent toward the rear face 40b side of the current collector 40. Specifically, the upper end of the cathode 38' is inserted into the cut-out S between the frame 34 and the edge 40c of the current collector 40, and is bent toward the side of the rear face 40b beyond the edge 40c of the current collector 40. In this way, the cathode 38' can be fixed to the current collector 40, i.e., in the electrolytic cell, without welding. When the cathode 38 corresponding to the first electrode is the existing electrode whose electrolytic performance has deteriorated and the cathode 38' corresponding to the second electrode is a new (electrolytic performance has not deteriorated) electrode, this solves the deterioration of the electrolytic performance.

As illustrated in FIG. 8, the bending step of the present embodiment preferably bends not only the cathode 38' but also at least a part of a peripheral edge of the mattress 44 to be located over the rear face 40b via the cut-out S. This means that preferably the upper end of the mattress 44 also is inserted into the gap S between the frame 34 and the edge 40c of the current collector 40, and is bent toward the side of the rear face 40b beyond the edge 40c of the current collector 40.

In the conventional electrode structure, the mattress 44 is partially spot-welded and fixed to the current collector 40 from the viewpoint of preventing sagging toward the lower end of the electrolytic cell 3 during electrolysis and the viewpoint of conductivity. The upper end (a part of the peripheral edge) of the mattress 44 is bent as in the present embodiment and is inserted into the side of the rear face 40b of the current collector 40, that is, at least a part of the peripheral edge of the mattress 44 extends to the rear face 40b beyond the edge of the current collector 40. This configuration eliminates the spot welding as described above. In this way, the present embodiment improves the workability during replacement of the components, and also prevents the breakage of the mattress that may occur due to the replacement. As a result, the present embodiment effectively prevents damage inside the electrolytic cell, such as damage of the ion exchange membrane.

For the bending step, the cathode 38' is preferably cut to a size slightly larger than the conducting portion of the electrolytic cell 3. Note here that bending length L described below refers to the dimension of the section (the section longer than the conducting portion) of the cathode 38' that is bent toward the side of the rear face 40b of the current collector 40, i.e., the dimension of the section of the cathode 38' and the mattress 44 that are located over the rear face 40b of the current collector 40. Preferably the bending length L is 5 mm or more and 20 mm or less. When the bending length L is 20 mm or less, the inserted portion of the cathode 38' and the mattress 44 tends to be able to fixed to the current collector 40 sufficiently. When the bending length L is 5 mm or more, the cathode 38' and the mattress 44 tends to hardly come off from the current collector 40. From the same viewpoint as above, the bending length L is more preferably 10 mm or more and 15 mm or less. Specifically the bending length L is specified as the shortest distance from the edge 40c to the ends of the cathode 38' and the mattress 44.

FIGS. 10 and 11 illustrate the configuration of the upper portion of the cathode 38' and the mattress 44, and the lower end of the cathode 38' and the mattress 44 may also be bent toward the side of the rear face 40b of the current collector 40. That is, both ends (the entire peripheral edge) of the cathode 38' and the mattress 44 may be bent toward the side of the rear face 40b of the current collector 40. In this way, the upper ends of the cathode 38' and the mattress 44 are bent toward the side of the rear face 40b of the current collector 40, and this fixes the cathode 38' and the mattress 44 to the current collector 40. The lower ends of the cathode 38' and the mattress 44 are bent toward the side of the rear face 40b of the current collector 40, and this fixes the cathode 38' and the mattress 44 to the current collector 40 more firmly, and more effectively prevents sagging of the mattress 44. More preferably, the entire outer peripheral edge of the cathode 38' and the mattress 44 may be bent toward the side of the rear face 40b of the current collector 40, and this fixes the cathode 38' and the mattress 44 to the current collector 40 more firmly.

To mount the cathode 38' and the mattress 44 to the current collector 40, the corner of the cathode 38' is preferably cut out. This enables insertion of the cut-out corner of the cathode 38'. A cut-out may be formed diagonally at the corner (a linear cut-out from the corner in the in-plane direction of the cathode) for insertion. Such cutting, however, tends to cause a tear of the cathode 38' from the cutting easily, and so it is preferable to cut out the corner as described above.

For a jig for bending the cathode 38' and the mattress 44 toward the side of the rear face 40b of the current collector 40, various known jigs may be used. Specifically, the ends of the cathode 38' and the mattress 44 can be pushed into the electrolytic cell 3 along the edge of the current collector 40 with a spatula or a rotary roller. This bends the cathode 38' and the mattress 44 for insertion into the rear face 40b of the current collector 40 for fixing. From the viewpoint of workability, the jig for bending the cathode 38' and the mattress 44 is preferably a rotary roller. The blade thickness of the rotary roller is preferably 0.2 mm or more. When the thickness is 0.2 mm or more, there is a tendency that the blade has a sufficient rigidity and so more easily insert the cathode 38' and the mattress 44. If the thickness is larger than the gap S between the current collector 40 and the frame 34 (the seal surface 34a for the gasket 36), the rotary roller does not enter the gap S, and this makes it difficult to bend the cathode 38' and the mattress 44 sufficiently. The thickness therefore is preferably in the range of 0.2 mm to 2 mm. The diameter of the rotary roller is not particularly limited, and typically the rotary roller with a diameter of about 100 mm is easy to operate.

As described above, the present embodiment includes the predetermined removal step, cutting step, and bending step, and so easily produces the electrode structure that is configured so that the ends of the cathode 38' and the mattress 44 are bent toward the side of the rear face 40b of the current collector 40 beyond the edge 40c of the current collector 40. That is, the method for producing an electrode structure of the present embodiment replaces the cathode 38' and the mattress 44 without welding, and enables a long-term use of the electrolytic cell 3 without damage.

FIGS. 10 and 11 illustrate the cathode 38' and the mattress 44 extending without being in contact with the rear face 40b of the current collector 40. This embodiment is acceptable as long as the cathode 38' and the mattress 44 are fixed to the current collector 40. From the viewpoint of firmly fixation, the cathode 38' and the mattress 44 preferably extend with being in contact with the rear face 40b of the current collector 40.

The above describes the electrode structure for the cathode (that is, the cathode structure), and the electrode of the present embodiment may be the anode. That is, the second electrode structure can be applied to the anode chamber as the anode structure. In this case, various known components may be used as the anode chamber, and various known components may be also used as the anode.

EXAMPLES

The following describes the present embodiment in more details by way of examples. The present embodiment is not limited to these examples.

Example 1

An expanded mesh-processed nickel plate having a size of 1154 mm×2354 mm (thickness 1.2 mm) was prepared as a current collector. Ni expanded metal (the electrode fixing member 39; thickness 1.0 mm) was fixed by spot welding so that the four peripheral sides of the current collector 40 were all covered with a width of 70 mm. At this time, only the vicinity of the end of the electrode fixing member on the opposite side of the edge 40c of the current collector 40 (close to the center of the current collector 40 in the plane direction) was welded for fixing. That is, the electrode fixing member 39 was fixed to the current collector 40 by welding only at the region corresponding to R2 in FIG. 5, and the region corresponding to R1 was not fixed. In this way, the electrode fixing member 39 was spot welded at the peripheral edge of the current collector 40, and then the mattress 44 having a wire diameter of 0.15 mm was fixed by spot welding to the current collector 40 (at positions close to a center of the current collector 40 in the plane direction). At this time, the mattress 44 was welded to the portion of the current collector 40 where the electrode fixing member 39 was not placed. Then, the cathode 38 including a fine mesh base material made of nickel coated with an oxide of ruthenium was bent with a rotary roller having the diameter of 100 mm, so that the end of the cathode 38 was inserted between the current collector 40 and the electrode fixing member 39 (see FIG. 4). That is, the cathode 38 was bent using a flat element so that the end of the bent cathode 38 was inserted into the gap defined between the current collector 40 and the electrode fixing member 39 welded to the peripheral edge. The bending length of the cathode 38 (bending length L3 in FIG. 4) was 10 mm.

This electrolytic cell was assembled into the electrolyzer. For the anode as a pair with the cathode of this cell, an electrode was prepared by coating the surface of an expanded mesh processed titanium plate with an oxide containing ruthenium, iridium, and titanium as components. ACIPLEX (registered trademark) F6801 was used for the ion exchange membrane. Salt water of 300 g/L was supplied as anode liquid, and diluted caustic soda was supplied to the cathode chamber so that the caustic soda concentration near the discharge port was 32% by weight. Electrolysis was then performed for 33 days in total, including the electrolysis for 4 days at the electrolysis temperature of 90° C., the anode-chamber gas pressure 40 kPa, the cathode-chamber gas pressure 44 kPa and the current density 4 kA/m$^2$, followed by the electrolysis for 29 days at the current density increased to 6 kA/m$^2$. Further, hydrochloric acid was added to the salt water to be supplied so that the pH of the salt water near the discharge port of the anode liquid was 2, and electrolysis was performed. No abnormality, such as damage, was found in the ion exchange membrane taken out after the electrolysis. Observation of the cathode seal surface after the electrolysis showed no corrosion.

Example 2

This example was a zero-gap electrolytic cell (the configuration is as illustrated in FIG. 7) having the width of 2400 mm and the height of 1289 mm. The cathode included a nickel fine mesh base material coated with ruthenium oxide, and the anode included a titanium base material whose surface was coated with an oxide containing ruthenium and iridium. The mattress was a nickel knitted product (wire diameter 0.15 mm). This electrolytic cell was assembled into the electrolyzer. ACIPLEX (registered trademark) F6801 was used for the ion exchange membrane. Salt water of about 300 g/L was supplied as anode liquid, and diluted caustic soda was supplied to the cathode chamber so that the caustic soda concentration near the discharge port was about 32% by weight. This electrolytic cell operated more than one year (hereinafter simply referred to as "Operation 1") at the electrolysis temperature of 80 to 90° C., the anode-chamber gas pressure 40 kPa, the cathode-chamber gas pressure 44 kPa and the current density 6 kA/m$^2$. After the operation, the electrolytic cell was taken out from the electrolyzer and the following operation was performed.

First, an adhesive member (nickel tape) 35 that was used to fix the cathode (existing cathode) 38 by spot welding to the seal surface of the electrolytic cell was peeled off by cutting the spot welded portion with a spatula. Then, the existing cathode 38 was also removed from the electrolytic cell (removal step; see FIG. 8). Subsequently, the mattress attached by spot welding was removed.

After cutting the four sides of the current collector 40 with a sander equipped with circular saw blade, burrs on the cut surface were ground with a file so that the length of the cut-out S, which was represented by the shortest distance from the edge 40c of the current collector 40 to the flange 34, was 5 mm (cutting step; see FIG. 9).

To the current collecting 40 having the periphery cut in this way, the mattress 44 having a wire diameter of 0.15 mm was fixed by spot welding. The cathode 38' then was placed on the mattress 44. While setting the bending length at 10 mm, the peripheral edge of the cathode 38' was bent with a rotary roller having the diameter of 100 mm so that the peripheral edge was located over the rear face 40b of the current collector 40 via the cut-out S. That is, the peripheral edge of the cathode 38' was bent toward the side of the rear face 40b of the current collector 40 for fixing (bending step; see FIG. 10). The cathode 38' included a fine mesh base material made of nickel coated with an oxide of ruthenium.

This electrolytic cell was assembled into the electrolyzer. ACIPLEX (registered trademark) F6801 was used for the ion exchange membrane. Salt water of about 300 g/L was supplied as anode liquid, and diluted caustic soda was supplied to the cathode chamber so that the caustic soda concentration near the discharge port was about 32% by weight. This electrolytic cell showed stable performance more than twelve months at the electrolysis temperature of 80 to 90° C., the anode-chamber gas pressure 40 kPa, the cathode-chamber gas pressure 44 kPa and the current density 6 kA/m$^2$.

Comparative Example 1

Operation 1 was performed in the same manner as in Example 2, and the electrolytic cell was taken out of the electrolytic tank after the operation. Then the removal step similar to Example 2 was performed. Next, a nickel tape having a width of 4 mm and a thickness of 0.08 mm was used to fix a cathode made of the same material as the existing cathode to the seal surface by spot welding (see FIG. 7). This electrolytic cell was assembled into the electrolyzer similar to Example 2. ACIPLEX (registered trademark) F6801 was used for the ion exchange membrane. Salt water of about 300 g/L was supplied as anode liquid, and diluted caustic soda was supplied to the cathode chamber so that the caustic soda concentration near the discharge port was about 32% by weight. This electrolytic cell operated one year at the electrolysis temperature of 80 to 90° C., the anode-chamber gas pressure 40 kPa, the cathode-chamber gas pressure 44 kPa and the current density 6 kA/m$^2$. After this operation, the ion exchange membrane was removed and the electrolytic cell was observed. No damage was observed. When the nickel tape was peeled off similarly to the removal step as stated above and the seal surface was observed. Three holes of 0.5 mm in diameter, which were considered as pitting corrosion, were found on the lower seal surface.

The above results show that the method for producing an electrode structure of the present embodiment is capable of reducing damage inside the electrolytic cell during replacement of the components, such as an electrode.

This application claims the priority based on the Japanese patent applications filed on Jul. 6, 2018 (Japanese Patent Application No. 2018-129276 and Japanese Patent Application No. 2018-129139), the contents of which are incorporated herein by reference.

REFERENCE SIGNS LIST

1 Electrolyzer
22 Anode chamber
32 Cathode chamber
38 Cathode
39 Electrode fixing member
40 Current collector
40a Surface (first face)
40b Rear face (second face)
40c Edge
42 Rib (support)
44 Mattress (elastic body)

The invention claimed is:

1. An electrode structure comprising:
   an electrode;
   a current collector facing the electrode;
   an elastic body located between the electrode and the current collector, the elastic body having conductivity; and
   an electrode fixing member located between the elastic body and the current collector,
   wherein at least a part of a peripheral edge of the electrode is fixed between the electrode fixing member and the current collector.

2. The electrode structure according to claim 1, wherein an entire peripheral edge of the electrode is fixed between the electrode fixing member and the current collector.

3. The electrode structure according to claim 1, wherein a partial length of the electrode located between the electrode fixing member and the current collector is 5 mm or more and 30 mm or less.

4. An electrolytic cell comprising:
   a cathode chamber;
   a partition wall facing the cathode chamber; and
   an anode chamber facing the partition wall, the anode chamber being located on an opposite side of the cathode chamber,
   wherein at least one of the cathode chamber and the anode chamber comprises the electrode structure according to claim 1.

5. An electrolyzer comprising:
   the electrolytic cell according to claim 4; and
   an ion exchange membrane facing the electrolytic cell.

6. A method for producing an electrode structure, comprising:
   a removal process of removing a first electrode from a structure comprising the first electrode, a current collector facing the first electrode, and a first elastic body located between the first electrode and the current collector, the first elastic body having conductivity;
   a placement process of placing a second electrode on the current collector;
   providing an electrode fixing member at a location between the first elastic body and the current collector; and
   a bending process of bending at least a part of a peripheral edge of the second electrode over the current collector to form a bent section, followed by fixing at least a part of the bent section between the electrode fixing member and the current collector such that the second electrode is fixed to the current collector.

7. The method for producing the electrode structure according to claim 6, wherein the first elastic body is further removed in the removal process, and
   in the placement process a second elastic body is placed on the current collector, followed by placing the second electrode on the current collector.

8. A method for producing an electrode structure, comprising:

a removal process of removing a first electrode from a structure comprising the first electrode, a current collector having a first face facing the first electrode and a second face on an opposite side of the first face, and an elastic body located between the first electrode and the first face of the current collector, the first elastic body having conductivity;

a cutting process of cutting at least a part of a peripheral edge of the current collector to thereby form a cut-out inside the structure; and a bending process of placing a second electrode on the elastic body, followed by bending the second electrode so that at least a part of a peripheral edge of the second electrode is located over the second face via the cut-out.

9. The method for producing the electrode structure according to claim 8, wherein the elastic body is bent so that at least a part of a peripheral edge of the elastic body is located over the second face via the cut-out in the bending process.

10. The method for producing the electrode structure according to claim 8, wherein the structure further comprises a flange that adheres to the first electrode via an adhesive member, and the adhesive member is removed to thereby separate the first electrode from the flange in the removal process.

11. The method for producing the electrode structure according to claim 6, further comprising:

fixing the electrode fixing member to a surface of the current collector such that a gap is defined between the surface of the current collector and an opposing surface of the electrode fixing member; and the fixing the at least the part of the bent section between the electrode fixing member and the current collector includes fixedly positioning the at least the part of the bent section within the gap.

\* \* \* \* \*